(No Model.)

W. C. HAWKINS.
PLOW.

No. 273,987. Patented Mar. 13, 1883.

WITNESSES:
Theo. G. Hoster
C. Sedgwick

INVENTOR:
W. C. Hawkins
BY Munn & Co
ATTORNEYS.

UNITED STATES PATENT OFFICE.

WILLIAM C. HAWKINS, OF LIMA, SOUTH CAROLINA.

PLOW.

SPECIFICATION forming part of Letters Patent No. 273,987, dated March 13, 1883.

Application filed November 14, 1882. (No model.)

*To all whom it may concern:*

Be it known that I, WILLIAM C. HAWKINS, of Lima, in the county of Greenville and State of South Carolina, have invented new and useful Improvements in Plows, of which the following is a full, clear, and exact description.

My invention relates to improvements in double-shovel plows; and it consists of a stirrer of peculiar construction for grass and weeds, adapted to be attached to the front or rear end of the plow-beam, as hereinafter more fully set forth, and pointed out in the claim.

Reference is to be had to the accompanying drawings, forming part of this specification, in which similar letters of reference indicate corresponding parts in all the figures.

Figure 1:
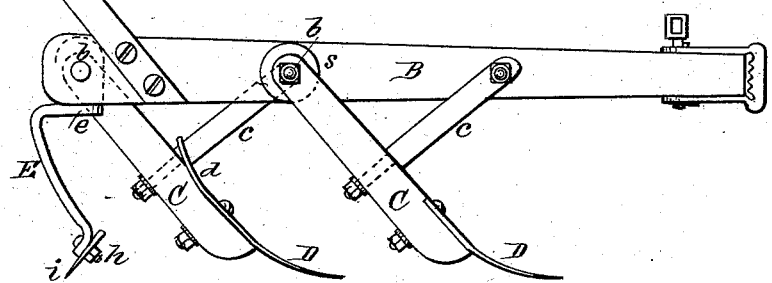
Figure 2:
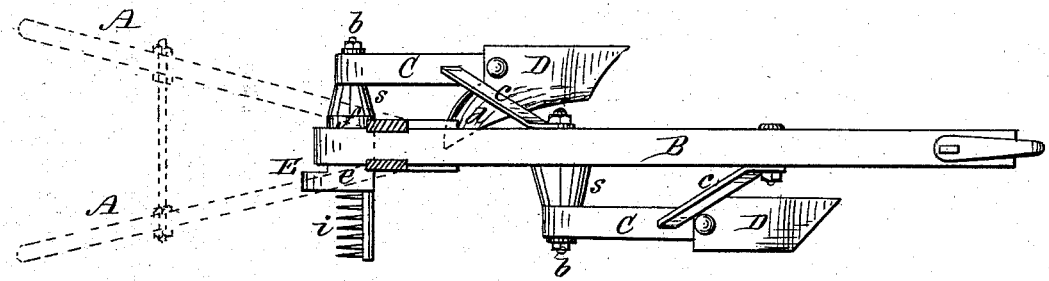
Figure 3:
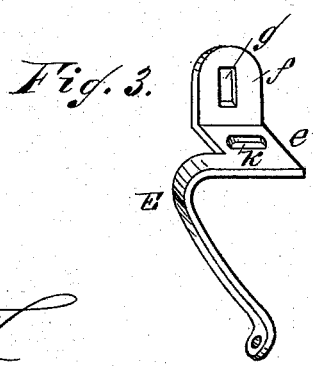

Figure 1 represents a side elevation of a plow embodying my invention, and Fig. 2 a plan of the same with the handles of the implement shown in dotted lines only. Fig. 3 is a view in perspective of an attachment, in part, to the plow for stirring up grass and weeds turned up by the plow, and thereby causing them to be more rapidly destroyed, and for other purposes.

A A are the handles of the plow, and B its beam, which has secured on opposite sides of it, one in advance of the other, by bolts $b\, b$ and braces $c\, c$, two legs, C C, inclining forwardly in a downward direction, and having the plow feet, shovels, or blades D D secured to their lower end portions. The left-hand or rear one of these blades is represented as constructed with a rear spreading or covering extension, $d$, on its inner side. Both feet or blades D D are set outward from their respective sides of the beam by blocks, washers, or sleeves $s\, s$, arranged to receive the bolts $b\, b$ through them and interposed between the beam A and legs C C. This construction makes one beam suffice, and not only secures extreme lightness, but great stiffness, so that when the plow strikes hard land it will be perfectly steady and its blades have little or no tending to be pressed toward each other or apart; also, such construction affords the greatest facility for removing either one of the blades with its attached leg, so that the implement may be converted into a single plow, or for moving the advance foot or blade back into line, on the opposite side of the beam, with the rear foot or blade, and securing both blades or their legs by a single bolt of the necessary length passing through said legs and the beam. This latter arrangement of the duplicate blades and their legs adapts the implement to a different use—that is, for covering seed.

E is an attachment formed, in part, of a crooked arm or bar constructed with an upper flattened lateral portion, $e$, having an upright side or cheek, $f$, for attachment under and to one side of the beam in its rear, the same bolt $b$ that secures the rear leg C to the beam passing through a slot, $g$, in the side cheek, $f$. This slot is oblong, whereby the attachment E may be raised or lowered to adapt it to its work, and, if desirable, be locked or held in position by either a wedge or otherwise. The lower end of this attachment E is bent or turned to slope downwardly in a rear direction, and has secured to it by a bolt, $h$, a stirrer, $i$, formed of a small board or rake-head. This stirring attachment is in no sense a furrow-leveling blade, its function, when applied as represented, being to stir up grass and weeds turned up by the plow, for the purpose of more thoroughly exposing them, and thereby causing them to be more rapidly killed. Furthermore, by putting additional washers or longer sleeves $s\, s$ on the bolts $b\, b$, the blades D D may be spread sufficiently far apart to straddle a row and run round it, and the rake or stirrer $i$ be caused to follow over the row, for the purpose of removing turf or clods from off the row and destroying all fine or small grass growing thereon. The head or portion $e$ of this attachment has also an oblong slot, $k$, in it for bolting and adjusting it, if desired, on the forward portion—as, for instance, in the place of the front colter, instead of on the rear end of the beam—for the purpose of turning weeds and stubble and pressing the weeds and stubble down, whereby the plow will do its turning and covering more effectually.

Having thus described my invention, what

I claim as new, and desire to secure by Letters Patent, is—

The adjustable attachment E, consisting of a crooked arm or bar provided with a rake or stirrer, i, at its lower end, and constructed with an upper lateral portion, e, and side cheek, f, having oblong slots g k, whereby the stirrer-arm can be secured to the front or rear end of a plow-beam, substantially as and for the purposes specified.

WILLIAM C. HAWKINS.

Witnesses:
HENRY P. GOODWIN,
WILLIAM C. GOODWIN.